United States Patent [19]
Steury

[11] 3,870,821
[45] Mar. 11, 1975

[54] PUSHBUTTON TELEPHONE PRINTER/RECORDER

[76] Inventor: Donald P. Steury, 9380 S. W. Lake St., Tigard, Oreg.

[22] Filed: Nov. 29, 1972

[21] Appl. No.: 310,236

[52] U.S. Cl. .......................... 179/2 DP, 179/84 VF
[51] Int. Cl. .......................... H04m 11/06
[58] Field of Search.... 179/2 DP, 2 R, 84 VF, 90 L, 179/3, 4

[56] References Cited

UNITED STATES PATENTS

| | | | |
|---|---|---|---|
| 3,403,225 | 9/1968 | Mislan | 179/2 R |
| 3,505,474 | 4/1970 | Quatse | 179/2 DP |
| 3,524,935 | 8/1970 | Gonsewski | 179/2 DP |
| 3,549,809 | 12/1970 | Stehr | 179/2 DP |
| 3,557,311 | 1/1971 | Goldstein | 179/2 DP |
| 3,573,376 | 4/1971 | Bartlett | 179/2 DP |
| 3,582,554 | 6/1971 | Le Blanq | 179/2 DP |
| 3,618,038 | 11/1971 | Stein | 179/2 DP |
| 3,647,973 | 3/1972 | James | 179/2 DP |
| 3,652,795 | 3/1972 | Wolf | 179/2 DP |
| 3,675,513 | 7/1972 | Flanagan | 179/2 DP |
| 3,778,553 | 12/1973 | Rackman | 179/2 DP |

*Primary Examiner*—William C. Cooper
*Assistant Examiner*—Thomas D'Amico
*Attorney, Agent, or Firm*—Chernoff & Vilhauer

[57] ABSTRACT

A printer/recorder apparatus, for use with a 12 or 16 key pushbutton telephone communications system, for providing a permanent record at the calling and/or called party stations of transmitted messages containing alphanumeric date. The apparatus is in the form of a compact, portable unit having a self-contained printer and adapted to be coupled acoustically and mechanically, but not electrically, to a telephone set. The alphanumeric characters, punctuation and mathematical symbols, and function signals for controlling the operation of the telephone or other device at the called station are arranged pursuant to a coding scheme into two groups, each group having a plurality of subgroups with individual members thereof corresponding to the 10 numeric buttons on the telephone dial, and the * and # buttons (and the other non-numeric buttons in a 16-key system) controlling the switching between groups and the cycling among subgroups. A selectably illuminable code chart display, mounted on the face of the unit, enables the sender of a message to determine the particular group and subgroup of characters, symbols and/or function signals selected.

6 Claims, 13 Drawing Figures

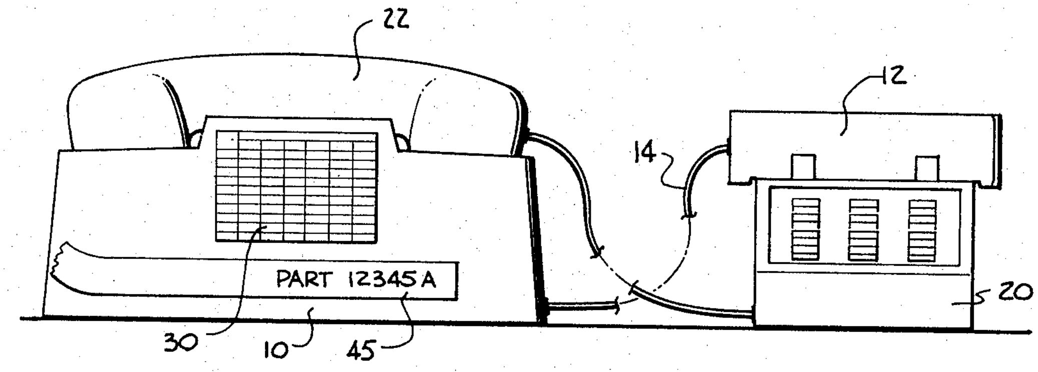
FIG. 1
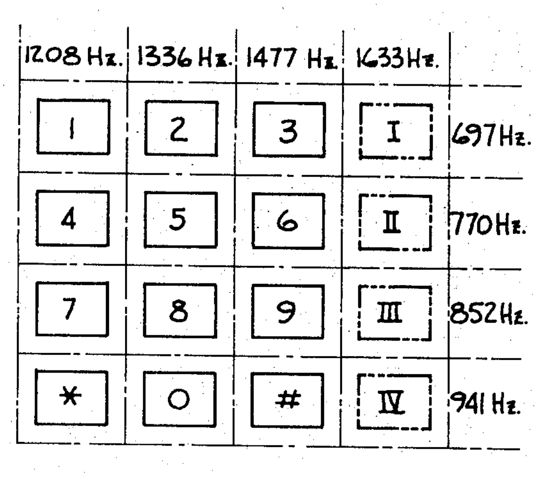
FIG. 2
| KEY NO. | * GROUP | | | # GROUP | | |
|---|---|---|---|---|---|---|
| | 1* | 2* | 3* | 1# | 2# | 3# |
| 1 | A | J | S | 1 | . | & |
| 2 | B | K | T | 2 | + | % |
| 3 | C | L | U | 3 | - | ? |
| 4 | D | M | V | 4 | = | 1 |
| 5 | E | N | W | 5 | ( | 2 |
| 6 | F | O | X | 6 | ) | 3 |
| 7 | G | P | Y | 7 | $ | 4 |
| 8 | H | Q | Z | 8 | * | Tc |
| 9 | I | R | , | 9 | / | BACK SPACE |
| 0 | SPACE | SPACE | SPACE | 0 | SPACE | ■ |
FIG. 3
EXAMPLE:
| MESSAGE KEYED (KEY NO.): | MESSAGE PRINTED: |
|---|---|
| * * 7 * * 1 * 9 * 20 # 12345 * 1 | PART 12345A |
| * * 5 * * 5540 # 75 | NEED 75 |
| * 2 * * 370 # 100 | BUY 100 |
FIG. 3A

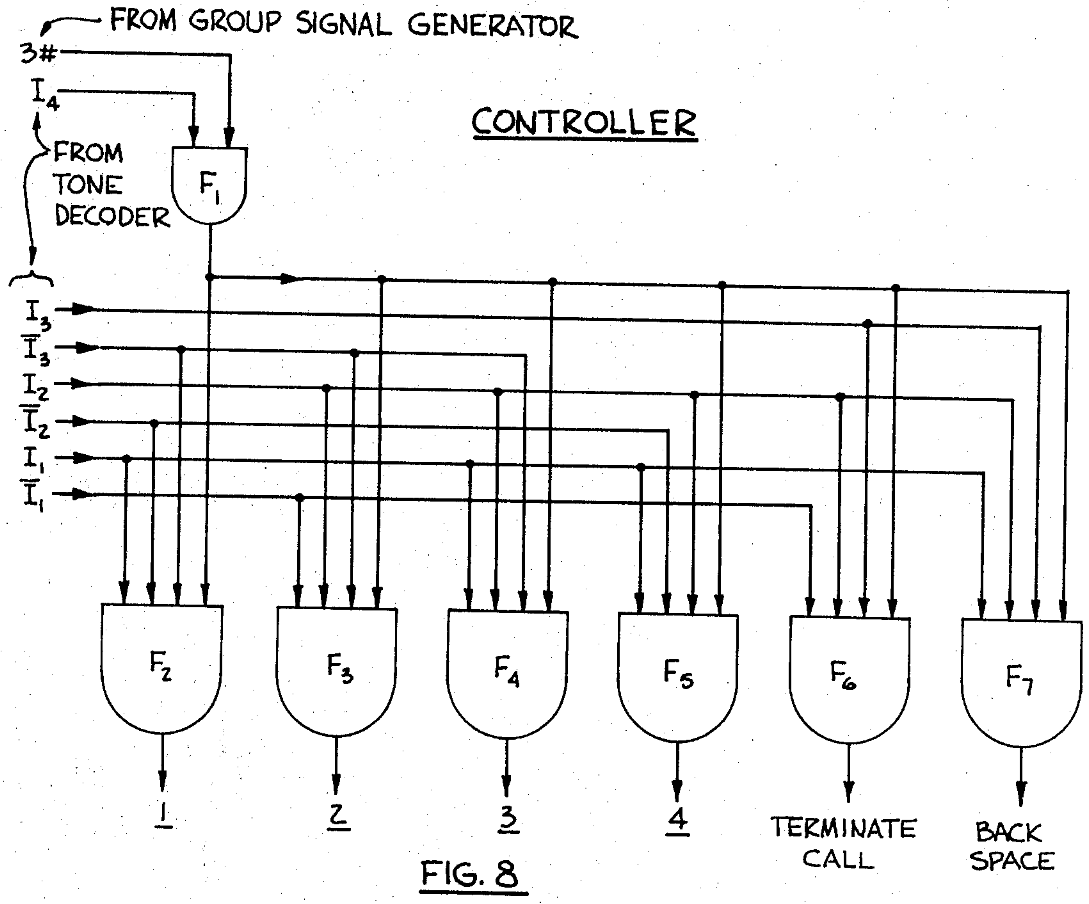
FIG. 8
TRUTH TABLE
| KEY | TONE | $I_1$ | $I_2$ | $I_3$ | $I_4$ |
|---|---|---|---|---|---|
| 1 | AD | 1 | 0 | 1 | 0 |
| 2 | BD | 0 | 1 | 1 | 0 |
| 3 | CD | 1 | 1 | 1 | 0 |
| 4 | AE | 1 | 0 | 0 | 1 |
| 5 | BE | 0 | 1 | 0 | 1 |
| 6 | CE | 1 | 1 | 0 | 1 |
| 7 | AF | 1 | 0 | 1 | 1 |
| 8 | BF | 0 | 1 | 1 | 1 |
| 9 | CF | 1 | 1 | 1 | 1 |
| * | AG | 1 | 0 | 0 | 0 |
| 0 | BG | 0 | 1 | 0 | 0 |
| # | CG | 1 | 1 | 0 | 0 |
| I | HD | 0 | 0 | 1 | 0 |
| II | HE | 0 | 0 | 0 | 1 |
| III | HF | 0 | 0 | 1 | 1 |
| IV | HG | 0 | 0 | 0 | 0 |
TONE TABLE
| | A | B | C | H |
|---|---|---|---|---|
| D | 1 | 2 | 3 | I |
| E | 4 | 5 | 6 | II |
| F | 7 | 8 | 9 | III |
| G | * | 0 | # | IV |
FIG. 5B
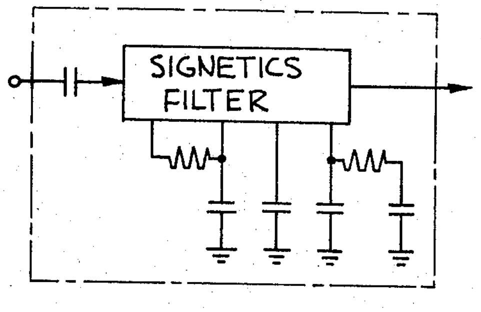
FIG. 5A

TRUTH TABLE

| GROUP | SHIFT METHOD | DIRECT METHOD | OUTPUT TO CHAR. GENERATOR $I_5$ | $I_6$ | $I_7$ |
|---|---|---|---|---|---|
| 1* | 1st AG | AG | 1 | 0 | 0 |
| 2* | 2nd AG | HD | 0 | 1 | 0 |
| 3* | 3rd AG | HE | 1 | 1 | 0 |
| 1# | 1st CG | CG | 1 | 0 | 1 |
| 2# | 2nd CG | HF | 0 | 1 | 1 |
| 3# | 3rd CG | HG | 1 | 1 | 1 |

TRUTH TABLE

| PULSE | $RS_1$ | $RS_2$ | $RS_3$ |
|---|---|---|---|
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| 8 | 0 | 0 | 0 |

PUSHBUTTON TELEPHONE PRINTER/RECORDER

BACKGROUND OF THE INVENTION

The present invention relates to apparatus for generating a printed record of information transmitted over a "pushbutton" (audio tone dial) telephone transmission system. More particularly, it relates to a printer/-recorder apparatus utilizable at either the sending or receiving telephone station for providing a visible printed record of alphanumeric information transmitted via the dial of a pushbutton telephone.

Sophisticated teletypewriter communications systems have been developed for transmitting alphanumeric information utilizing the audio tones generated within a standard 12-button touchtone telephone instrument of the type now in widespread use throughout the United States. However, these prior art systems typically require complex equipment at the receiving station to decode the transmitted information and actuate the keys of a typewriter or other printing or display device. Further, there has heretofore not been available apparatus, of economic, portable design, for enabling the sender, using any conveniently available pushbutton telephone, to obtain a record of his message as transmitted so as to insure accurate transmission as well as provide the sender with a permanent record of the transmitted message.

In many telephone communications applications such as, for example, communications involving deaf persons, the phoning in of orders by salesmen to a central location, the placing of orders for stock transactions and other situations requiring the accurate transmission of messages to be recorded at an unattended receiving station, it is highly desirable that a visible printed record of of the received message be made at the called station. In the aforementioned applications it is highly advantageous that the sender also have a record of the message actually transmitted, both to insure accuracy in the transmission as well as providing a permanent visible record of the transmitted message. For example, a sending telephone station, when equipped with a printer for recording both transmitted and received messages and connected by the telephone communications system to a central computer facility, could be readily utilized as a remote data terminal for both the transmission and reception of alphanumeric information from the computer on an on-line basis. In a simple, but far more common application, a printer recording apparatus located at an unattended telephone receiving station could be utilized to record the name, telephone number and other information transmitted by calling parties.

Various devices and systems have been disclosed, prior to the advent of the pushbutton telephone, for providing a printed record or other visible indication at an unattended telephone of the number of a calling party or other information transmitted by the caller. However, these earlier devices typically required either special equipment at the calling party's telephone and/or at the telephone company central station, in addition to the presence of a recording or display device at the called party's station. Also, telephone data transmission and control systems utilizing special input and output units at both the calling and called party's stations are well known to the art and in this latter category would be included telephone-telegraph, telephone facsimile and teletypewriter transmission systems.

In Scantlin U.S. Pat. No. 3,371,172 a communications system is disclosed utilizing a pushbutton telephone for the transmission of pulse trains containing digital data to a called party's location at which point a tone converter or decoder would be employed to convert the tone trains into electrical impulses for controlling the operation of an information unit. Morgan U.S. Pat. No. 3,515,814 describes the utilization of a pushbutton telephone as the data communications link between an input terminal and a remote computer. Goldstein U.S. Pat. No. 3,557,311 shows an input keyboard coupled to an associated printer for the transmission of alphanumeric data over a pushbutton telephone and the recording at the calling party's station of the transmitted message. Finally, Flanagan et al U.S. Pat. No. 3,675,513 describes a pushbutton telephone transmission system in which a modified typewriter is coupled to the receiving station for providing a permanent record of data transmitted by the user at the sending station of either a modified typewriter for automatically coding messages to be sent over the telephone or, alternatively, direct inputting of the message through manual actuation of the dial buttons on the pushbutton telephone set.

SUMMARY OF THE PRESENT INVENTION

The present invention is directed to improvements in pushbutton telephone communications and recording systems of the general type described in the aforementioned Flanagan et al. patent. In lieu of modified typewriters, the present invention employs self-contained apparatus, useful at either the sending or receiving stations, to receive and decode the audio tones transmitted by a pushbutton telephone dial and then utilize the electrical signals thereby generated for actuating a solid state printer. The resultant economies achieved in size, complexity and cost, by eliminating the need for coupling a modified typewriter to the telephone communication system as proposed by Flanagan et al., permit the achievement of a low-cost, compact printer/-recorder unit which is readily portable between telephone stations.

The printer/recorder apparatus of the present invention, which is adaptable for use at either the sender or receiver telephone station, is coupled to a pushbutton telephone set. A code chart display for indicating the particular selected set of characters, symbols and/or function signals corresponding to the individual numeric buttons of the telephone dial, with selectably illuminated portions controlled by switching code signals generated by the actuation of appropriate buttons on the telephone dial, is provided on the unit, together with a tape printer. When used at an unattended receiving station, a solenoid-controlled hold-down bar, provided with the unit, is positioned over the disconnect buttons of the telephone base so as to pick-up and terminate a received call at the appropriate instances.

In the coding scheme employed, the alphanumeric characters, punctuation and mathematical symbols and control function signals are segregated into two groups, each having three subgroups. The first group contains basically the alpha characters together with a spacing function. In the second group, the first subgroup contains the numeric characters, the second subgroup has punctuation and mathematical symbols, and the last subgroup contains a combination of additional symbols together with control functions such as end-of-message signal, error signal and the like.

The selection of a particular group and subgroup is made by actuation of the * and # symbols on the standard 12-key pushbutton telephone set. The particular subgroup selected at any point in time is indicated by illumination of a corresponding portion of the code chart display. Actuation of one or more of the 10 numeric keys on the telephone dial will then generate a tone signal (actually, a pair of tones) corresponding to the particular character, symbol or function associated with the number position in that group. In this fashion, with six subgroups, selectable by use of the * and # buttons, and with ten numeric buttons, it is possible to select a designated one among 60 characters, symbols and control functions. A combination of cycling between subgroups and shifting between groups, through actuation of the * and # buttons, enables messages, containing a mixture of alphanumeric characters, symbols and function signals such as spacing and the like, to be speedily transmitted with a minimum of delay as, at worst, the change from a previously transmitted character, symbol or function to the transmission of the next character, symbol or function will require a maximum of four button actuations. On the other hand, when an alpha portion of the message is being transmitted, selection and transmission of a desired alpha character will require a maximum of three and a minimum of one button actuations.

In anticipation of the widespread use by the telephone system of 16-key (i.e., 16 audio tone pair combinations) pushbutton telephone dials (now limited principally to military installations), provision is made in the apparatus of the present invention to accommodate both 12 and 16-key message transmissions interchangeably. With a 16-key pushbutton dial the four additional non-numeric buttons can be utilized, together with the * and # buttons, for direct selection, with a single button actuation, of the appropriate group and subgroup of alphanumeric characters, symbols and functions.

Audio tones, coded as described above, are transmitted over the telephone communications link and received at the called party's telephone station where they are acoustically or inductively coupled to the input of an amplifier in the recorder/printer unit. The same tone signals, as generated, are acoustically coupled to a recorder/printer unit which may be located at the calling party's telephone station. The audio tone signals are decoded and converted into electrical pulse trains, with the * and # signals (and the other non-numeric key signals in a 16-key system) applied as shifting signals to select the appropriate group and subgroup, and the alphanumeric characters and symbols selected are then supplied to the printer mechanism. The function signals, upon decoding, control the spacing advance of the printer, the end of message signal, and other control functions for the unit or other devices coupled thereto, such as a computer, alarm, etc., as desired.

It is therefore a principal objective of the present invention to provide a new and improved printer/-recorder apparatus, for use with a pushbutton telephone communications system, which can be used at an unattended telephone station to answer a call and receive messages containing alphanumeric information.

It is a further objective of the present invention to provide an inexpensive and compact printer/recorder unit, for use with a pushbutton telephone communications system, which is interchangeably utilizable at either the sending or receiving telephone stations and readily portable between telephone stations.

It is yet a further objective of the present invention to provide a coding scheme for the speedy transmission of alphanumeric messages over a pushbutton telephone communications system which is easily memorized and readily adaptable for direct transmission inputing to a standard pushbutton dial, without need for any additional apparatus at the sending telephone station.

It is a principal feature and advantage of the present invention to provide, in a printer/recorder apparatus for use with a pushbutton telephone communications system, that the message recorded by the apparatus at the sending party's telephone station is obtained by decoding of the audio tone signal information actually transmitted at the sending station over the telephone link.

It is a further feature of the present invention to provide, in a printer/recorder apparatus for use with a pushbutton telephone communications system, a code chart display on the face of the instrument divided into portions which are selectably illuminated in response to audio tone switching signals indicating the particular set of alphanumeric characters, symbols and/or function signals selected among a plurality of such sets available for transmission.

It is yet a further feature of the present invention to provide, in a pushbutton telephone printer/recorder of the type described, the facility for handling interchangeably either 12-button or 16-button message transmissions in which the non-numeric buttons are utilized for the selection of particular sets of alphanumeric characters, symbols and/or function signals.

It is a still further feature of the present invention to incorporate an inexpensive, solid state printer into an apparatus for recording messages transmitted or received over a pushbutton telephone communications system.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 1 shows an illustrative embodiment of the pushbutton telephone printer/recorder apparatus of the present invention.

FIG. 2 is a table depicting the keyboards of standard 12 and 16-key pushbutton telephone systems and the frequencies of the tone pairs generated by each key on the telephone keyboard.

FIG. 3 is a table depicting an exemplary coding scheme of alphanumeric characters, symbols and function signals employed with the apparatus of FIG. 1. The Figure also depicts the selectably illuminable code chart display panel associated with the printer/recorder apparatus of FIG. 1.

FIG. 3A is an example showing the manner in which a message is transmitted in accordance with the coding scheme of FIG. 3.

FIG. 5A is a schematic diagram showing an exemplary form of tone filter circuit which may feasibly be utilized in the tone decoder of FIG. 5.

FIG. 5B comprises a pair of tables, a tone table and a truth table, showing the relationship between an input tone signal and the resultant output electrical pulse signal in the tone decoder.

FIG. 8 is a schematic diagram of the controller portion of the printer/recorder unit of FIG. 4.

DETAILED DESCRIPTION OF THE INVENTION

Figure 4:
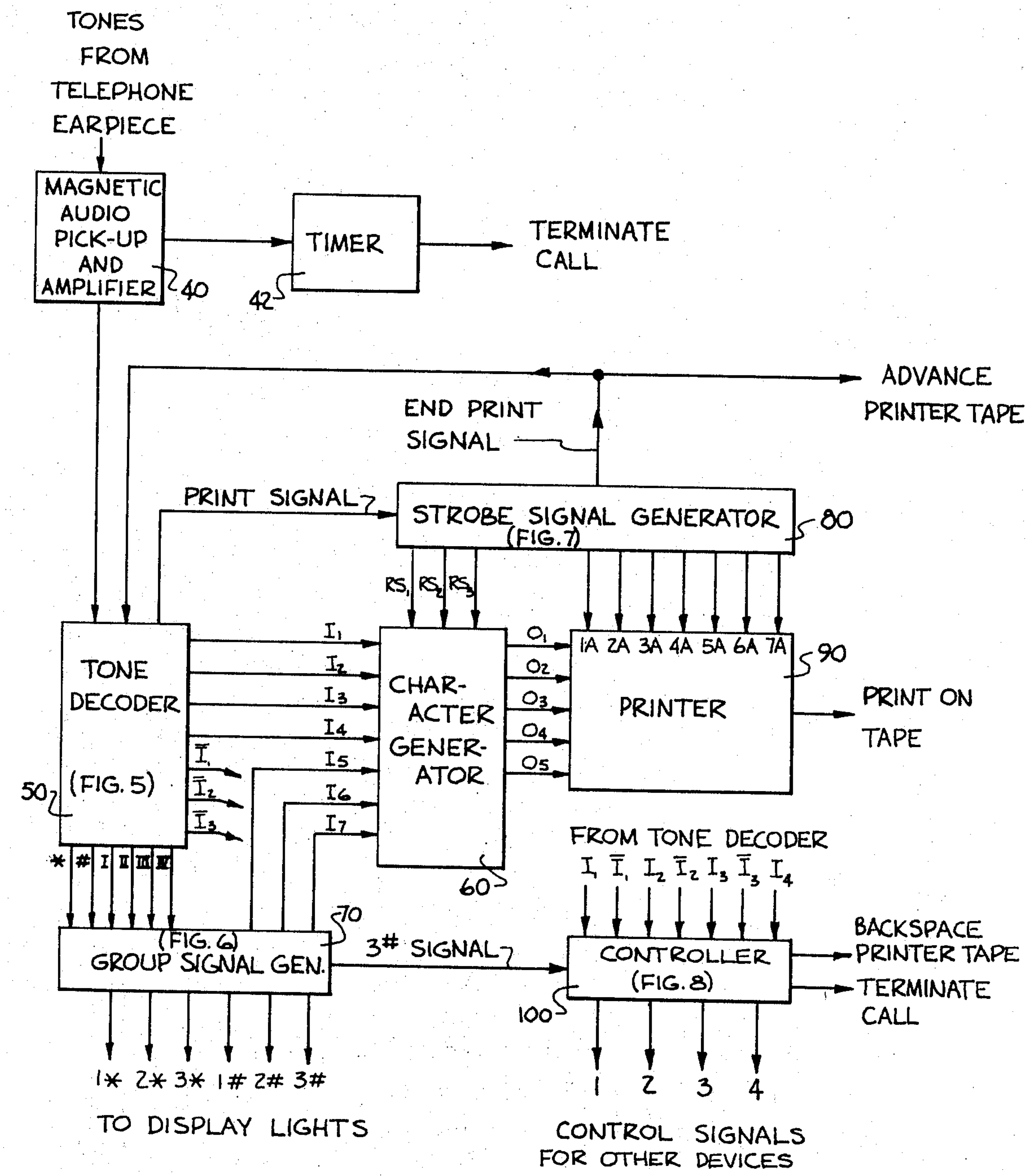
FIG. 4 is a block diagram of the telephone printer/-recorder unit of FIG. 1 showing the principal component portions thereof.

FIG. 1 shows an illustrative embodiment of a telephone printer/recorder apparatus of the present invention, usable interchangeably at a receiver or sending telephone station, which comprises a console unit 10 and an accesory unit 12 which is used when the apparatus is installed at an unattended telephone for receiving transmitted messages. The housing of the console unit 10 contains a battery power supply, audio transducer amplifier, filtering and logic circuitry, and a printer, as will hereinafter be more fully described. The telephone handpiece 22 of a conventional pushbutton telephone 20 rests on the top of the console housing with its earpiece in acoustic communication with a microphone in the housing for picking up the tone pair signals transmitted over the telephone line.

A selectably illuminable code chart display panel 30 is provided on the face of the console to indicate to the user, typically the sender of a message, the coding scheme arrangement and the particular group and subgroup of characters selected by the switching codes, as will hereinafter be more fully explained. The output of the unit is in the form of an advancing strip of paper tape 45 on which the message is imprinted and which emerges from an opening in the console housing. The accessory unit 12 rests on top of the telephone's hold-down buttons and contains a solenoid-actuated bar for releasing and depressing the hold-down buttons in response to signals received over line 14 from the console 10. In addition to audio signals received by a microphone in the console unit from the earpiece of the telephone handpiece 22, the audible ring signals of the telephone are picked up through a separate microphone located in the accessory unit 12 and used to generate control signals for answering the telephone through release of the hold-down bar in the accessory unit in a manner well known to the art. Thus, in operation of the apparatus as a message receiver at an unattended telephone station, upon ringing of the telephone

20, the device answers the call by responding to the ring tones and providing electrical signals to the accessory unit 12 to release the hold-down buttons on the telephone. Thereafter, the audible tone pairs transmitted over the telephone line will be received and processed by the console 10 for conversion into a printed message on tape 45. When the message transmission is complete, as indicated by the transmission of a "terminate call" signal or, alternatively, if no discernible audible tone pair signal is received in the predetermined period of time (say 20 seconds), the telephone call is terminated by a signal from the console 10 to the accessory 12 to depress the hold-down buttons of the telephone.

Without the accessory portion 12 the console unit 10 can be utilized alone at a sending telephone station to provide a printed tape record of the message actually transmitted over the telephone line. Alternatively, at an attended telephone station where an operator is available to manually answer a call by picking up the telephone receiver, the accessory unit can be dispensed with and the console unit 10 used by itself to convert the received audio signals transmitted by actuation of the pushbuttons of the sending telephone into a printed message.

FIG. 2 is a table showing the keyboard of a standard 12 and (in phantom lines) 16-key pushbutton telephone, and the frequencies of the tone pairs generated by each key. In the case of the standard 12-button telephone, depression of any given key on the dial causes the instrument to generate one of 12 distinctive pairs of audio tones which are combinations of seven audio tones, with each pair comprising one tone from a low range of frequencies and one tone from a high range. The 12 buttons on the dial are marked 1–9, 0, * and #. In addition, letters of the alphabet are associated with the numeric buttons by additional markings on the dial, but these letter groupings are disregarded in the coding scheme employed in the present invention. Thus only the numeric designations of the 10 numeric keys will be referred to in the following description. In the 16-button telephone dial, the four additional non-numeric keys, which are identified here for purposes of convenience as I, II, III and IV, provide four additional tone pairs comprising one tone from a low range of frequencies and a high-range tone signal at 1,633Hz.

In the coding scheme employed in the present invention, which is interchangably usable with both 12 and 16-key pushbutton telephone systems, the non-numeric keys, *, # (and, in the case of the 16-key telephone, I–IV) are used to select a given set of 10 members from a population of six sets containing in the aggregate 60 members in the form of alphanumeric characters, symbols and control signals. The numeric keys are then utilized to select a given member in a selected set of 10.

As depicted in FIG. 3, which is both a table illustrating the exemplary coding scheme employed with this invention, as well as a representation of the code chart display panel 30 associated with the console unit 10 of the printer/recorder apparatus, the population of 60 characters, symbols and control signals is arranged into two groups of 30, with each group having three subgroups of 10 members each. The first group of 30, designated the * group and consisting of three subgroups designated 1*, 2*, and 3*, covers the 26 alpha characters, a punctuation symbol, and a spacing function which, for convenience and facility of use, is provided in each subgroup. Thus, in the * group, the numeric keys 1–9 are used to select alpha characters and the 0 key is used for a spacing function to separate words. The other group of 30, designated the # group and consisting of three subgroups designated 1 #, 2 #, and 3 # utilizes the first of its three subgroups for the 10 numeric characters, the second and part of the third subgroup for symbol elements (such as the arithmetical symbols and certain punctuation symbols), and the remainder of its third subgroup for control signals for operation of the printer/recorder and for actuation or control of associated computers or other accessory apparatus. For example, the control signals in the 3 # subgroup could be utilized as format codes for a computer system to describe the data being transmitted, or to initiate the operation of accessory devices such as tape drives and the like. In this mode, key 8, designated by the symbol "$T_c$," is used to terminate a call by generating an energizing signal for the solenoid controlling the operation of the hold-down bar in the accessory unit 12. Similarly, key 9 in this mode provides a printer backspace function, and key 0 a black box or delete symbol, which together provide means for error correction. When an error has been made and the sending party wishes to correct the message on the tape, he can, by utilizing these two keys, backspace the printer tape to the beginning of the erroneous message portion and blank it out, and then proceed to transmit the correct message characters.

In operation, at any given instant of time a particular subgroup of a designated group is the selected mode of operation of the printer/recorder apparatus, and this selected subgroup is indicated by illumination of the appropriate column of the code chart panel display 30. Switching or transfer from one subgroup to another subgroup within the same group, or to another subgroup in the other group, is accomplished by the transmission of switching signals generated by the non-numeric keys, *, # (and I–IV).

In the exemplary coding scheme employed in the present invention, and considering initially the operation of the device with a standard 12-key pushbutton telephone, the shifting rules for transfer and selection of groups and subgroups are as follows, depending upon the mode (i.e., group, subgroup) that the unit is in at the time the shift is to be made:

1. If the unit is set on the * group, the * key will cycle the unit among the * subgroups in the following pattern; 1* to 2* to 3* to 1* to 2*, etc.

2. If the unit is set on the # group, the # key will cycle the unit among the # subgroups in the following pattern; 1 # to 2 # to 3 # to 1 # to 2 #, etc.

3. If the unit is set on the * group, the # key will shift the unit directly to the 1 # subgroup.

4. The unit is set on the # group, the * key will shift the unit directly to the 1* subgroup.

5. The numeric keys, 1–9 and 0, have no effect on shifting.

An example of the manner of use of the aforedescribed coding scheme in the transmission of a message containing alphanumeric characters is shown in the diagram of FIG. 3A. In the example shown, it is assumed that at the time of the initiation of the message the recorder unit is in the # shift mode, that is, at the beginning of the message the selected mode was one of the three subgroups comprising the # group. (In synchronizing the recording unit to the transmitting station, so that both will be in the same mode at the beginning of a message transmission, it is merely necessary that, prior to the initiation of the message transmission, the sender actuate the * key and then the # key, or vice versa. Alternatively, a reset circuit could be provided, if desired, to automatically restore both sending and receiving units to a designated mode when a call is initiated.)

In addition to the alphanumeric characters forming the message depicted in the example of FIG. 3A, actuation of the control signals contained in the 3 # subgroup can be used for correcting errors, terminating the message transmission and other optional control functions.

Turning now to the construction of an exemplary embodiment of the telephone printer/recorder unit, the block diagram of FIG. 4 shows the basic components of the unit, with details of certain of the component elements being provided by FIGS. 5–8. As shown in FIG. 4, the audio-frequency tone pairs transmitted to the telephone at the receiving station are acoustically coupled to a pick-up microphone 40 where they are converted to corresponding electrical signals by transducer and amplifier 40. (Instead of the audio transducer shown, an inductive coil could alternatively be used to sense the transmitted tone signals.) If no signals are sensed by the transducer 40 for a predetermined time interval, as determined by timer 42, then a signal is generated to terminate the call by actuating the solenoid controlling the hold-down bar in the accessory unit 12. Thus, the unit will automatically terminate a call either when the message transmission is completed or, alternatively, if no message is being transmitted over the telephone line, regardless of whether the sender actuates the terminate call control signal "$T_c$."

Assuming that a message transmission is underway, the electrical signals representing the transmitted audio tone pairs are fed to a Tone Decoder 50. The Tone Decoder comprises a set of filter elements and associated logic elements for converting a selected tone pair of the set of 12 (or set of 16 in the case of a 16-key telephone system) into a respective one of a plurality of binary signals depending upon both the particular tone pair transmitted and the mode (group, subgroup) that the unit is in at the time of transmission of the tone pair. In brief, the Tone Decoder produces binary output signals which comprise (a) four of the seven input signals to the Character Generator 60 which is a buffer element used to form the corresponding alphanumeric character to be printed, (b) the *, # and I–IV signals that activate the Group Signal Generator 70 which establishes the mode of the unit, and (c) the "print signal" which triggers the Strobe Signal Generator 80 whose output drives the printer 90 to print the character on tape or other recording medium. The remaining signal inputs to the Character Generator 60 are provided by the Strobe Signal Generator 80 and the Group Signal Generator 70, each of which in turn is responsive to signals received from the Tone Decoder 50. The output of the Group Signal Generator, in addition to providing the other three input signals to the Character Generator which are used to form the character selected, also supplies energizing signals to illuminate the code chart display 30 on the face of the console unit to indicate the particular mode (group and subgroup) selected.

The function signals in the transmitted message, that is those signals which comprise part of the 3 # subgroup, are also supplied, upon decoding by the Tone Decoder 50 and mode establishment by Group Signal Generator 70, to Controller 100 whose logic circuitry converts the input binary signals into actuating signals for terminating the telephone call, backspacing the printer tape and other control functions.

Figure 5:
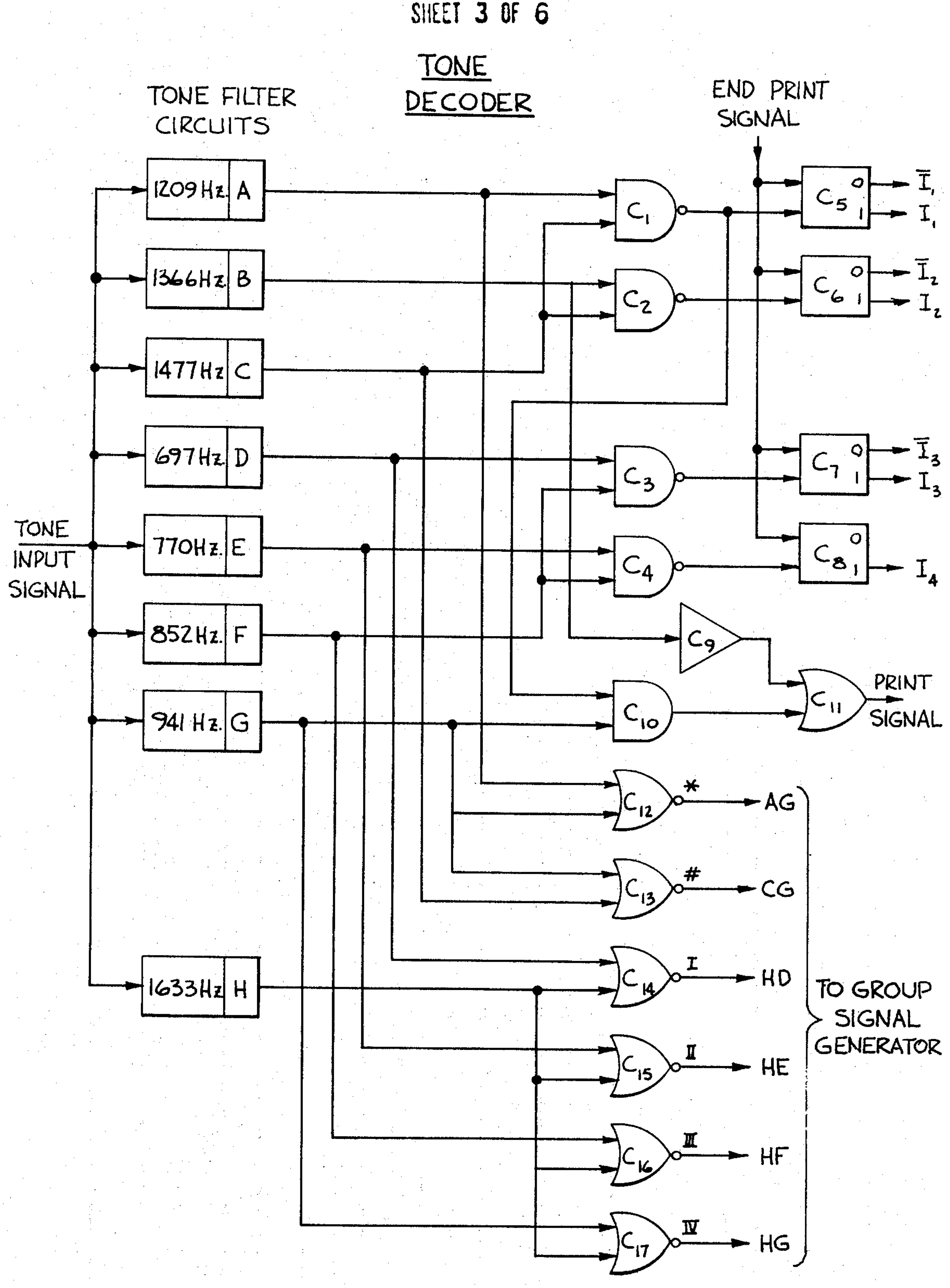
FIG. 5 is a schematic diagram of the tone decoder portion, of the printer/recorder unit of FIG. 4, which receives audio tone signals and converts them to corresponding electrical signals.

Turning now to a more detailed description of the construction and operation of this embodiment of the printer/recorder unit, the Tone Decoder 50, shown in FIG. 5, receives the amplified tone pair signals from the pick-up transducer 50 and these in turn are applied to a set of eight audio filters responsive to the eight discrete frequencies transmitted in the tone pair combinations produced by actuation of the keys of a 16-key pushbutton telephone dial. (As previously stated, the unit is designed to be compatible for use with both 12 and 16-key pushbutton telephone dial systems; if 12-key only capability were desired, one of the filters could be omitted, the logic circuitry simplified and other design economies achieved in the system.) A suitable tone filter circuit construction for the Tone Decoder 50, employing Signetics model 567 tuned filters, is shown in FIG. 5A. Each one of the eight tone filters, designated by the letters A–H, is tuned to one of the frequencies generated by the pushbutton telephone communications system and, when a particular filter responds to a tone signal to which it is tuned, a negative output signal is produced. A pair of such filter output signals are generated for each tone pair combination received by the recorder unit, and, as depicted in associated tone table and truth table of FIG. 5B, appropriate logic circuitry comprising NAND gates $C_1 - C_4$ and flip-flops $C_5 - C_8$ are provided to convert the input tone pair signal caused by actuation of one of the 12 (or 16 keys of the telephone dial into a binary-coded signal appearing on the designated output lines $I_1 - I_4$ of the Tone Decoder as indicated in the truth table.

In operation, actuation of numeric key 1, by way of example, generates the tone pair designation indication by tones A and D, key 2 will produce tones B and D, and so forth. As shown in the truth table, the pair of tones produced by actuation of a respective key produces the binary signal pattern indicated in the truth table as appearing on output lines $I_1 - I_4$. As will be readily apparent to those conversant with digital logic circuitry, the NAND gates $C_1 - C_4$ will produce positive signals when either of their respective inputs are negative. Accordingly, $C_1$ will produce a positive output signal when either tones A or C are received; $C_2$ will produce a positive signal when either tones B or C are received, and so on. Flip-flops $C_5 - C_8$ are set on the 1 output by the respective NAND gates and are held on this setting until the "end print" signal is applied which resets all of the flip-flops to the "0" state. In the "0" state flip-flops $C_5 - C_7$ produce the negation output signals $\overline{I_1} - \overline{I_3}$ respectively which, together with the output signals $I_1 - I_4$ are utilized for character and function selection in a manner to be hereinafter described. NOR gates $C_{12} - C_{17}$ are coupled to respective outputs of the tone filter circuits A – H and are utilized to generate appropriate mode establishment signals for the Group Signal Generator 70. Thus, for example, actuation of the * key which is one of the keys used to shift modes generates, as shown in the tone table, negative output signals on tone filters A and G which are applied to the NOR gate $C_{12}$ producing a positive output signal thereon. In similar fashion, actuation of the other mode-shifting keys ( # , I–IV) will produce respective output signals for application to the Group Signal Generator 70.

$C_{11}$ is an OR gate which will produce a positive signal utilized as the "print signal," when any of its inputs is positive. The "print signal" is produced by this gate when any of the 10 numeric keys 0–9 are depressed (in certain situations when the unit is in the 3 # mode, actuation of a particular numeric key generates a function signal such as "printer backspace" which is not intended to be printed, and this is handled by appropriate programming of the Character Generator 60.)

Figures 6, 6A:
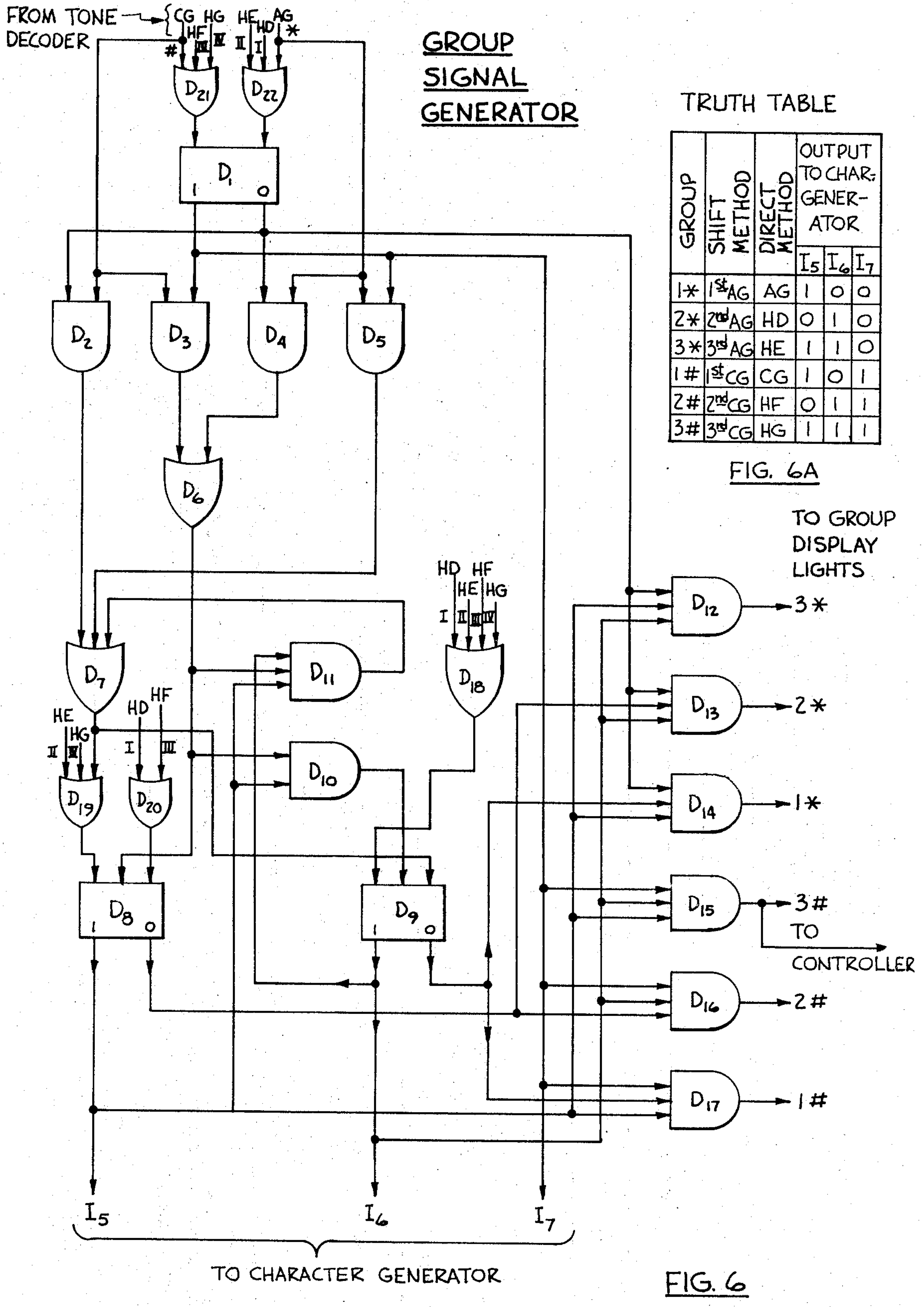
FIG. 6 is a schematic diagram of the group signal generator portion of the printer/recorder unit of FIG. 4.
FIG. 6A is a truth table showing the relationship between the input switching signals and the resultant output signals of the group signal generator.

The outputs AG, CG, HD, HE, HF and HG (corresponding to the mode shift signals *, # , I–IV, respectively) generated by the Tone Decoder are supplied to the Group Signal Generator 70. The function of the Group Signal Generator, circuit details of which are shown in FIG. 6, is to establish the mode of the printer/recorder unit, as determined by the mode-shifting signals supplied thereto by the Tone Decoder, and, in response thereto, to provide additional input signals $I_5 - I_7$ to the Character Generator 60 for selection of the characters to be printed. The Group Signal Generator also provides actuation signals for illumination of the code chart display panel so as to indicate to a user the particular group and subgroup in which the unit is presently operating. The code chart display is particularly useful when the unit is provided at a sending telephone station so that the user can readily determine the particular mode then under selection before he transmits a character by actuation of a telephone key. The associated truth table shown in FIG. 6A indicates the binary signals on ooutput lines $I_5$, $I_6$ and $I_7$ generated by the Group Signal Generator for the six mode settings of the unit. In the shift method, for use with 12-key pushbutton telephone systems, shifting between modes is accomplished by actuation of the * and # keys, whereas, in the direct method of mode selection available with a 16-key telephone dial, mode selection of the group and subgroup is made directly by the signal actuation of the appropriate one of the six non-numeric keys *, # , I–IV.

The logic circuitry of the Group Signal Generator comprises flip-flops $D_1$, $D_8$ and $D_9$, OR gates $D_6$, $D_7$, $D_{18}$, $D_{21}$ and $D_{22}$, and AND gates $D_2 - D_5$, and $D_{10} - D_{17}$. By way of example of the manner of operation of the Group Signal Generator, if flip-flop $D_1$ is set on "0" and a # signal (CG) is received, AND gate $D_2$ will allow the signal to pass through the OR gates $D_7$ and $D_{19}$ and set flip-flop $D_8$ to the "1" state and flip-flop $D_9$ to the "0" state which causes output line $I_5$ to display a positive or "1" binary signal and output line $I_6$ a "0". The # signal will also switch flip-flop $D_1$ to the "1" state and thereby set output line $I_7$ to "1," so that the output on lines $I_5 - I_7$ in binary form is "101." The flip-flops $D_1$, $D_8$ and $D_9$ will also activate the AND gate $D_{17}$ and thereby cause the 1 # group display light to be turned on, with all other group display lights off.

A second # signal following thereafter from the output of the Tone Decoder will pass through AND gate $D_3$ and OR gate $D_6$ into the clock input of flip-flop $D_8$ and also through AND gate $D_{10}$ into the clock input of flip-flop $D_9$. Flip-flops $D_8$ and $D_9$, together with AND gate $D_{10}$, form a binary counter. Thus, the second # signal will cause both flip-flops $D_8$ and $D_9$ to switch states so that $I_5$ is set on "0" and $I_6$ is on "1", thus turning on group display light 2 #.

A third # signal will, after processing through the aforementioned logic circuitry, set the output lines $I_5$ – $I_7$ to "111." A fourth # signal will pass through AND gate $D_{11}$ and reset the binary counter formed by flip-flops $D_8$ and $D_9$ back to the "10" state, thereby returning the output of the counter back to the 1 # subgroup corresponding to the binary signal "101" on the output lines $I_5$ – $I_7$.

In corresponding fashion, the * signals (AG) set flip-flop $D_1$ to the "0" state, thus changing $I_7$ to a "0", with the states of the other two output lines $I_5$ and $I_6$ determined by the number of counts of successive * signals and by the binary counter comprised of $D_8$, $D_9$ and $D_{10}$, in the same manner as previously described for the # signals.

In the direct mode selection method, the six tone pair combinations corresponding to the keys *, # and I–IV are processed by the logic circuitry to produce on output lines $I_5$ – $I_7$ the associated binary signals corresponding to the individual groups as indicated in the truth table. At the same time, these mode selection signals turn on the group display light corresponding to the mode selected. The mode selection signals HD, HE, HF and HG, corresponding to the keys I–IV, set the flip-flops $D_1$, $D_8$ and $D_9$ directly to the states corresponding to the respective groups. For example, HE (corresponding to key II) will set flip-flop $D_8$ to the "1" output, flip-flop $D_9$ to "1," and flip-flop $D_1$ to "0," producing the binary signal on output lines $I_5$ – $I_7$ of "110."

The output of AND gate $D_{15}$, besides energizing the associated group display light 3 #, is taken off and applied to the Controller 100 as an enabling signal for the respective function signals which are supplied thereto.

The Character Generator 60, to which the binary signals on lines $I_1$ – $I_7$ are supplied from the Tone Decoder and Group Signal Generator and which may be for example similar to the Texas Instruments TMS 2400 series, is a read-only memory element capable of storing the matrix patterns for forming a plurality of possible printed characters and symbols. The binary input signals $I_1$ – $I_7$ supplied to the Character Generator select by their coding the particular matrix pattern corresponding to a desired character and this information in turn is strobed out of the Character Generator into the Printer 90 in response to the strobe sequence signals $RS_1$, $RS_2$ and $RS_3$ generated by the Strobe Signal Generator 80. The Printer 90 in turn is a solid-state, 5 × 7 matrix-type thermal printer, such as Texas Instruments model EPN 2201, compatible with the Character Generator and prints on the advancing tape 45, through the use of a dot matrix pattern, the particular character or symbol formed in the memory of the Character Generator.

Figures 7, 7A:
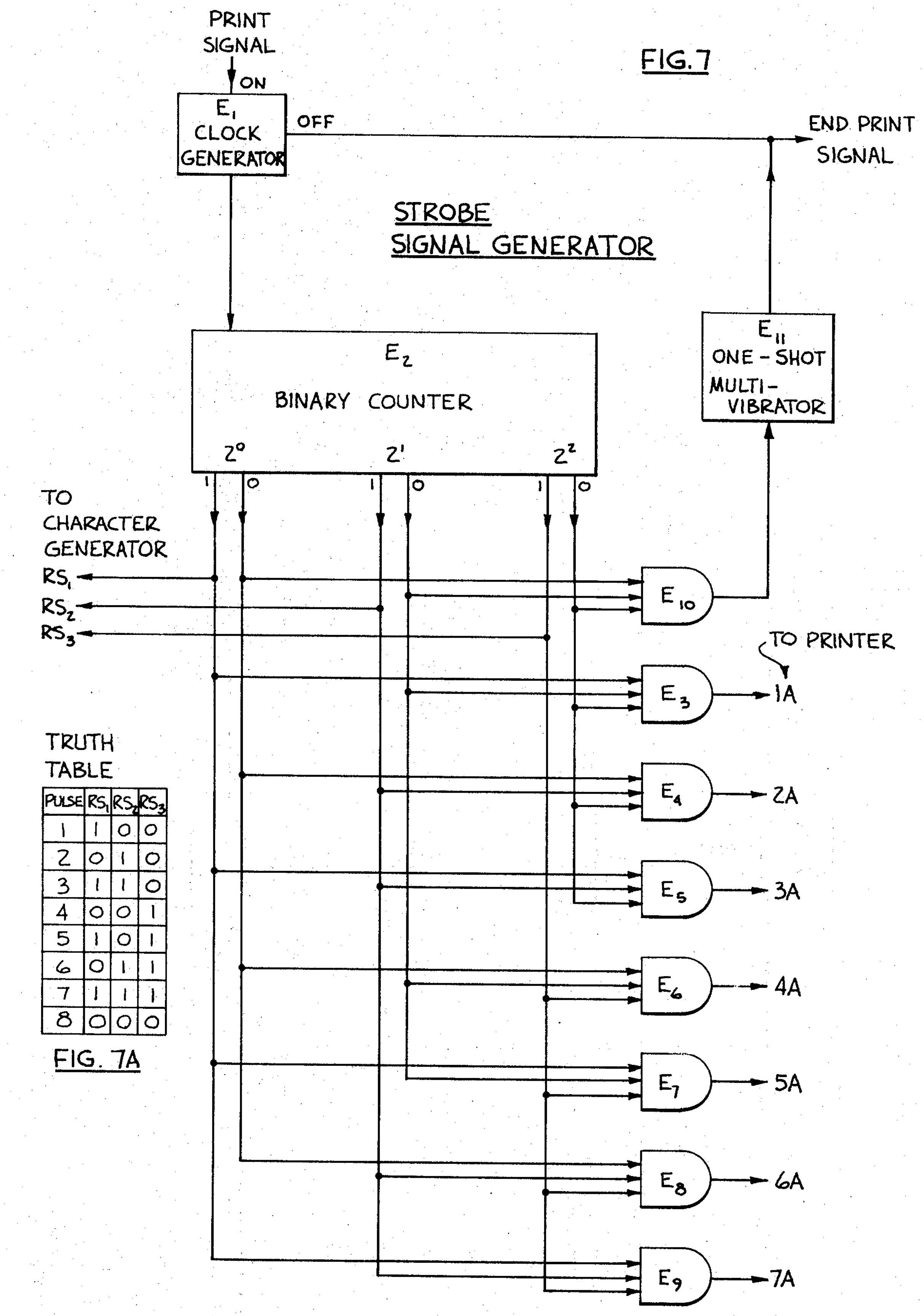
FIG. 7 is a schematic diagram of the strobe signal generator portion of the printer/recorder unit of FIG. 4.
FIG. 7A is a truth table showing the relationship between the input clock pulses and the resultant output pulse signals of the strobe signal generator.

The Strobe Signal Generator 80, circuitry details of which are shown in FIG. 7, develops a train of binary pulses on lines $RS_1$, $RS_2$ and $RS_3$ in response to the receipt of the "print signal" from the Tone Decoder for reading out the stored matrix pattern of the selected character or symbol from the Character Generator and also supplies a train of seven pulses on lines 1A–7A for strobing the Printer 90. More particularly, on receipt of the "print signal," clock generator $E_1$ is activated and the pulses generated thereby are supplied to binary counter $E_2$. The first clock pulse in the train will cause the output of the counter $E_2$ to be "100" which will provide the first read signal for the Character Generator (see the associated truth table of FIG. 7A) and will also cause AND gate $E_3$ to generate the first of the strobe train of seven output signals, 1A, to the Printer. The second clock pulse will change the output of the binary counter $E_2$ to "010" which supplies the second activating read signal and produces an output on AND gate $E_4$, and so forth. At the end of the cycle, the eighth clock pulse from $E_1$ changes the output of the counter $E_2$ back to "000," producing an output on AND gate $E_{10}$ which in turn activates one-shot multivibrator $E_{11}$ whose pulse output serves as an "end print" signal for turning off clock generator $E_1$ and for resetting the flip-flops $C_5$ – $C_8$ in the Tone Decoder. The operation of the Strobe Signal Generator 80 is thus to read out the selected character formed in the memory of the Character Generator by supplying activating signals $RS_1$, $RS_2$ and $RS_3$ and, at the proper time, supply the strobe sequence of signals 1A–7A to the Printer as the character read out from the Character Generator over the five output lines $O_1$–$O_5$ is supplied to the Printer.

Turning finally to the Controller element, details of which are shown in FIG. 8, logic circuitry comprised of AND gates $F_1$ – $F_7$ is provided to convert the binary coded input signals received from the Tone Decoder which correspond to control functions into output signals appearing on designated lines for energizing appropriate control elements. The first AND gate, $F_1$, is enabled by the receipt of the 3 # signal from the Group Signal Generator 70 which indicates that the group 3 # mode has been selected. Thus, only when the unit is in this mode will activation of the numeric keys on the telephone dial result in the production of control signals at the output of the Controller 100. In the exemplary coding scheme for the group 3 # mode shown in the table of FIG. 3, numeric keys 4–9 correspond in this mode to designated functions or control signals. Accordingly, depression of key 4, for example, while the unit is in the 3 # mode causes the Tone Decoder to generate binary signals on output lines $I_1$, $\overline{I_2}$ and $\overline{I_3}$, thus activating AND gate $F_2$ and creating the control signal 1. In similar fashion, depression of numeric key 5 will activate AND gate $F_3$ and create the control signal 2, etc. The "terminate call" and "backspace" signals are internal function signals for controlling and operation of the recorder/printer unit, and "1", "2", "3" and "4" are external function signals which may be used to control other devices if so desired.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An attachment apparatus for use in transmitting messages by a pushbutton-type tone-signalling telephone having numeric keys and non-numeric keys, each key when actuated generating respectively distinct audio-frequency tone signals, comprising:

a. converter means for receiving and converting said audio-frequency tone signals generated by said message sending telephone into corresponding distinct electrical signals:

b. selector means coupled to said converter means for responding to those of said electrical signals which correspond to transmitted tone signals generated by actuation of a non-numeric key on said sending telephone, said selector means selecting among a plurality of character grouping modes and generating signals representative of the particular mode selected, wherein at least one of said non-numeric keys has assigned thereto more than one character grouping mode of said plurality of character grouping modes; and c. display means coupled to said selector means and responsive to said mode selection signals for visually indicating which particular one of said character grouping modes of the plurality of character grouping modes assigned to a respective non-numeric key, has been selected as well as indicating the characters comprising said selected character grouping mode.

2. The attachment apparatus of claim 1 including second selector means responsive to said mode selection signals from said first selector means and said numeric key signals from said sending telephone for selecting to be printed a particular character from among the collection of characters in said plurality of character grouping modes, the number of characters in said collection being substantially larger than the total of numeric and non-numeric keys on said sending telephone, and the number of character grouping modes in said plurality of character grouping modes being larger than two, wherein said selector means selects said particular character in response to a single actuation of said numeric key; and printer means coupled to said second selector means for printing said selected character onto a visible record medium.

3. The apparatus of claim 1 wherein said first selector means cyclically selects among the respective character grouping modes associated with each said non-numeric key in response to successive actuations thereof.

4. The apparatus of claim 2 wherein said first selector means cyclically selects among the respective character grouping modes associated with each said non-numeric key in response to successive actuations thereof.

5. The apparatus of claim 4 further including control means responsive to signals received from said first and said second selector means for generating respective output signals for controlling the operation of said printer means.

6. The apparatus of claim 5 further characterized in that certain of said signals generated by said control means are adapted for controlling the operation of apparatus other than said printer means.

* * * * *

Disclaimer and Dedication 3,870,821.—*Donald P. Steury*, Tigard, Oreg. PUSHBUTTON TELEPHONE PRINTER/RECORDER. Patent dated Mar. 11, 1975. Disclaimer and Dedication filed Apr. 13, 1990, by the inventor.

Hereby disclaims and dedicates to the Public the remaining term of said patent.

[ *Official Gazette August 7, 1990* ]